United States Patent [19]

Besseyre et al.

[11] 3,975,588
[45] Aug. 17, 1976

[54] ACOUSTIC FEEDBACK CONTROL

[75] Inventors: Jacques A. Besseyre, Nice; Christian A. Jacquart, Gattieres; Jean-Louis H. Marijon, Saint Laurent du Var, all of France

[73] Assignee: International Business Machines Corporation, Armonk, N.Y.

[22] Filed: Dec. 13, 1974

[21] Appl. No.: 532,548

[30] Foreign Application Priority Data
Dec. 21, 1973  France .................. 73.47136

[52] U.S. Cl. ............. 179/1 FS; 179/1 HF; 179/170.2
[51] Int. Cl.² ......................... H04M 1/20
[58] Field of Search ........ 179/1 F, 1 FS, 170.8, 179/170.2, 1 HF, 1 VC, 170.6, 15.55 T, 81 B

[56] References Cited
UNITED STATES PATENTS

| | | | |
|---|---|---|---|
| 3,562,448 | 6/1968 | May, Jr. | 179/170.6 |
| 3,673,355 | 6/1972 | La Marche et al. | 179/170.6 |
| 3,735,055 | 5/1973 | Thomas | 179/170.2 |
| 3,821,494 | 6/1974 | Besseyre | 179/170.8 |
| 3,832,491 | 8/1974 | Sciulli | 179/1 VC |

OTHER PUBLICATIONS

IEEE Transactions On Communication, Dec. 1972, A Digital Echo Suppressor For Satellite Circuit, pp. 1176–1181

*Primary Examiner*—Kathleen H. Claffy
*Assistant Examiner*—Joseph A. Popek
*Attorney, Agent, or Firm*—Frederick D. Poag

[57] ABSTRACT

An acoustic feedback control to be installed in every extension provided with a loud speaker and a microphone in a digital telephone system. Each extension is provided with a coder and a decoder of the syllabic compression type which therefore have quantizing steps varying with the voice level at the input of the transmission channels between two extensions. A comparator receives the step information from the coder and decoder and prevents the decoder step from increasing when the coder step exceeds the decoder step.

16 Claims, 5 Drawing Figures

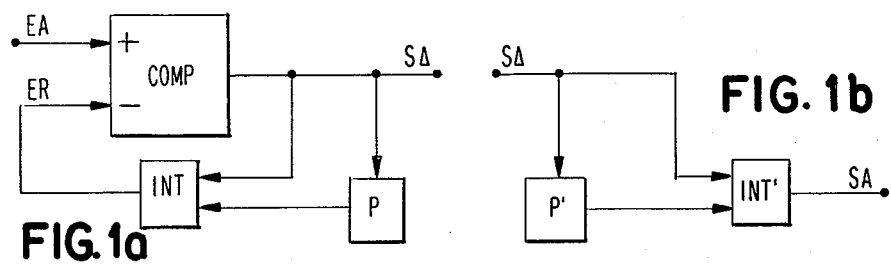
FIG. 1a
FIG. 1b
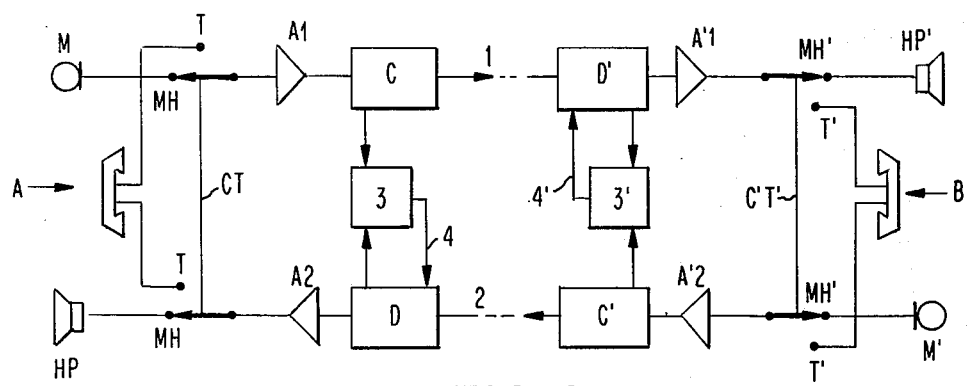
FIG. 2
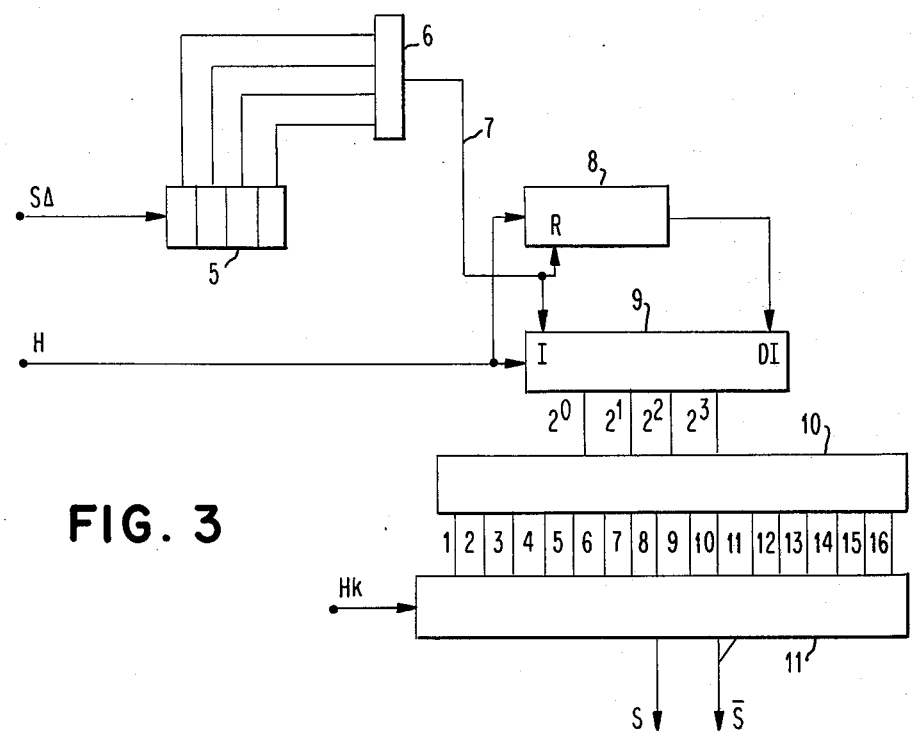
FIG. 3

ACOUSTIC FEEDBACK CONTROL

BACKGROUND OF THE INVENTION

1. Field of the Invention

This invention relates to acoustic feedback control, sometimes called an anti-Larsen device, provided in the telephone extensions of a digital telephone system. The device of this invention is more particularly designed to be installed in the extensions provided with a loud speaker and a microphone, in which the coders used for the analog/digital conversion of the voice signals are of the syllabic compression type.

2. Prior Art

At the present time, the use of telephone extensions provided with a loud speaker and a microphone is becoming more and more extensive, such extensions having several advantages. The use of such an extension enables the subscriber to do something else, for example, to take notes of something. Also, it is possible to arrange collective telephone calls since several persons present in a room provided with such an extension can participate to a same telephone call.

However, the use of such extensions involves some problems. The unavoidable acoustical coupling existing between the loud speaker and the microphone can initiate oscillations on the loop comprised of the microphone/loud speaker channels involved in the connection, the gain of said loop being able to exceed one. This effect is known as the Larsen effect and appears as unpleasant singing which is to be cancelled.

It is obvious that the relative positions of the microphones and loud speakers should be selected to reduce, as much as possible, the effect of the acoustical coupling, but all the effects cannot be cancelled in this way.

Many devices are known in the prior art to cancel the Larsen effect experienced in the analog type telephone systems. In this type of system, since the transmission of analog signals on a line always involves losses, it is necessary to provide amplifiers at the emitting end and at the receiving end and the Larsen effect can be cancelled by adjusting the gain of these amplifiers by hand or automatically.

This solution is not generally applicable to the digital systems since, in the digital systems, the damage caused to the pulses during on line transmission does not involve any weakening of the reconstructed analog signal amplitude and, consequently, it is not necessary to provide amplifiers which could be used to adjust the gain of the loop.

Various means of the prior art have been used to solve this problem. One can refer to two solutions known today and used in a system in which a connection between extensions provided with a microphone and a loud speaker, is made by two different transmission channels connecting the microphones and loud speakers of the extensions used in the call. The telephone extensions being adapted to the transmission of voice signals in the form of digital signals, each extension is provided with an analog/digital coder at the microphone output and with a digital/analog decoder at the loud speaker input.

At each end of the connection, the signal issued from the coder output represents the voice signal transmitted on a transmission channel and the signal applied to the decoder input represents the voice signal received from the second transmission channel and thus represents the voice signal applied to the input of this channel. Two measuring circuits are provided at each end, the first one being connected to the coder output and supplying, according to the digital information it receives, an output voltage representing the level of the voice signal on the corresponding channel, the second one being connected to the decoder input and supplying, according to the digital information it receives, an output voltage representing the level of the voice signal on the corresponding channel. A comparator receives these two output voltages and the comparator output signal indicates which channel input is provided with the voice signal with the highest level.

To cancel the Larsen, i.e. acoustic feedback, effect, only the use of this channel is effectively required in the call since the two connected subscribers do not generally talk at the same time.

Therefore, in one of the solutions described in the prior art, a switch is installed at each end on the channel issued from the microphone. This switch, in rest position, operates to disconnect the microphone/coder assembly from the channel and a rest signal is provided on this channel. When the comparator output signal indicates that the signal applied to the input of a channel shows a level exceeding the level of the signal applied to the input of the second channel, the corresponding channel switch is closed and the connection is made through this channel. Since, on this time, the second channel is "open", the Larsen effect does not appear. The position of the switches will change as the call proceeds according to the output signal continuously generated by the comparator.

Such a solution has a disadvantage due to the fact that a channel which should be normally open can be closed if a spurious noise appears, at the corresponding end, strong enough to cause the comparator to close said channel and, consequently, to open the second one. In this case, the call is momentarily disturbed.

In the second solution of the prior art, said switches are removed and the comparator output signal acts on a control logic circuit to modify the sensitivity of the modulators and demodulators of a same extension by modifying the magnitude of the quantizing step.

This solution is better due to the fact that the channels are never open; therefore, the above indicated disadvantage is overcome.

However, both solutions show a same disadvantage. In implementation, a number of additional circuits are required to perform the level comparison. These additional circuits are relatively complicated since each on implies the use of a pulse group analysis circuit including a pulse generator, a logic circuit to supply output pulses having a duration depending on the configuration of the digital pulses on the channel and, therefore, on the level of the signal on the channel, and an integrator to obtain, from this pulse, an analog voltage indicating the level of the signal on the channel. The time constants of the integrators being able to vary and not being absolutely equal in all the measuring circuits, errors can appear in determining the amplitude.

SUMMARY OF THE INVENTION

Therefore, the major object of this invention is to provide an anti-Larsen device usable in the same environment as before but not having the above indicated disadvantages. More particularly, the device of this invention includes only a minimum number of components and operates entirely in digital mode.

Although the two above-described devices of the prior art apply, in particular, to a telephone system using a compression type coding, they do not use the information relating to the level of the voice signal which is already contained in the coders and decoders to be able to carry out this type of coding. This leads to the necessity of providing the additional circuits required to obtain this information.

In contrast, a primary object of this invention is fulfilled by taking into account the inherent characteristics of the syllabic compression coders and decoders used, in general, to code a voice signal.

Therefore, the device of this invention is especially well adapted to use in a telephone system in which the voice signals are transformed into digital information in syllabic compression coders. This coding mode is the mode generally used for voice coding due to the nature of the voice signal which can show important slopes for which the quantizing noise would be important, should a simple coding without compression be used. The compression operating principle is well known in the art and applies to the coding known as the "delta modulation" or to the coding known as the "pulse coded modulation" (PCM). According to this principle, the amplitude of the analog signal is considered. For example, for delta coding, the height of the quantizing step varies in accordance with the signal slope and, for PCM coding, the compression can be carried out after linear coding, the amplitude information being taken from the linear coding.

In all these types of coders it is, therefore, obviously necessary to provide means for supplying information relating to the value of the voice signal.

Therefore, the anti-Larsen device of this invention can be used in a telephone system, in the connections between extensions provided with a loud speaker and a microphone. Each extension of this type includes a microphone connected to a coder as defined above and a loud speaker connected to a decoder. The telephone connection between two extensions will be established through a first channel connecting the microphone of the first extension to the loud speaker of the second extension and a second channel connecting the loud speaker of the first extension to the microphone of the second extension. As in the systems of the prior art, since there is effectively no line drop, the amplitude information in the coder of the first channel indicates the signal level at the input of the first channel and the amplitude information in the decoder of the first channel indicates the signal level at the input of this channel. In the same way, the amplitude information in the coder of the second channel indicates the signal level at the input of the second channel and the amplitude information in the decoder of the second channel indicates the signal level at the input of this channel. At each end of the connection, a comparator is connected, on the one hand, to the coder, and on the other hand, to the decoder, thus receiving an indication about the level of the signals at the input of the two channels involved in the connection.

When, at one end of the connection, the comparator indicates that the level of the signal emitted on a channel through the coder exceeds the level of the signal received on the other channel through the decoder, one deduces that the subscriber is talking at this end of the connection. The output signal of the comparator indicating this condition acts on an inhibit circuit connected to the decoder placed at this end to prevent the decoder step from increasing. Thus, the signal received by the extension at this end will be limited in amplitude, and only the channel through which the voice signals are emitted operates normally.

To avoid any ambiguity when the amplitudes of the signals at the input of both channels are below a certain determined threshold value, the anti-Larsen circuit will be inhibited when this condition is detected and both channels operate normally.

When both subscribers talk in the same time, which is unusual, there are three possibilities:

If the levels of the signals on the channels are below the threshold value, both channels will operate normally;

If the signal levels are equal and exceed the threshold value, the anti-Larsen device at each end of the connection acts on the decoders and the signals on both channels are limited in amplitude at the receiving end; and If the signal levels are not equal and exceed the threshold value, one channel having the higher level will operate normally and the signal received on the other channel will be limited in amplitude.

These and other objects, advantages and features of the present invention will become more readily apparent from the following specification when taken in conjunction with the drawings.

BRIEF DESCRIPTION OF THE DRAWINGS

FIGS. 1a and 1b are schematic views of a compression coder and of an expansion decoder of the syllabic type, respectively.

FIG. 2 ia a general view of a circuit according to the principle of this invention.

FIG. 3 shows a circuit employed in computing the step in the coders and decoders of FIG. 2.

DESCRIPTION OF A PREFERRED EMBODIMENT

Figure 4:
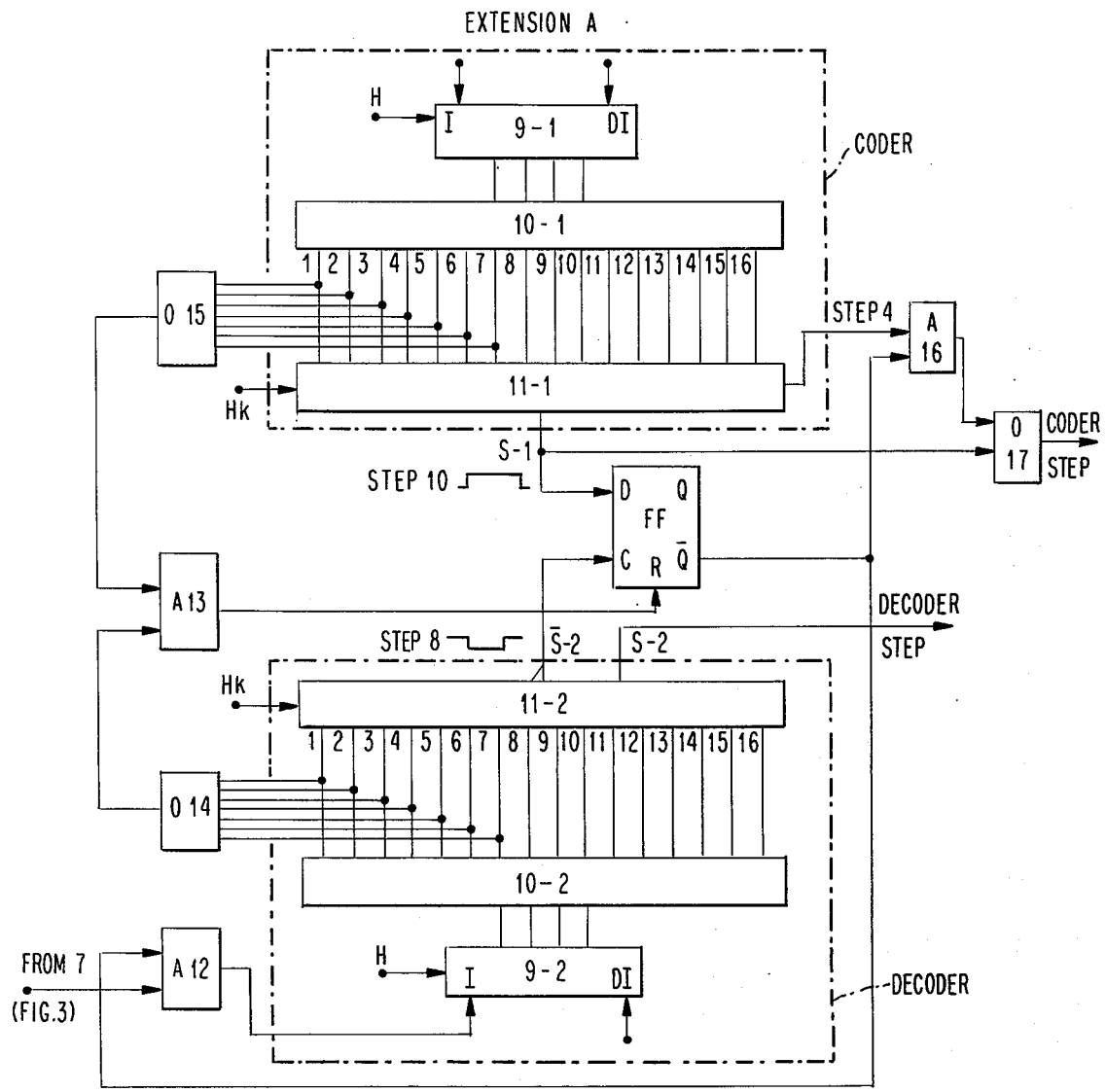
FIG. 4 shows the anti-Larsen device according to a preferred embodiment of this invention.

Before describing the invention, some general information about the syllabic compression delta modulation will be recalled and a circuit for determining the quantizing step in the delta coders and decoders will be given as an example, said circuit being particularly appropriate to be used in this invention. However, it should be understood that other circuits can be used provided that they can supply an indication about the value of the amplitude of the signal to be coded or decoded.

A delta coder, as shown on FIG. 1a, includes a comparator COMP. receiving the analog signal to be coded on a first input EA and a locally reconstructed analog signal on its second input ER. The comparator is controlled by a clock signal of frequency F, for example $F = 64$ KHz, and the comparison is performed at this frequency. It will supply a level 1 if the analog signal is higher than the reconstructed signal and a level 0 is not. Signal SΔ at the output of the comparator is applied to an analysis circuit P which, according to the digital information, computes the compression coder step so that the reconstructed signal is as close as possible to the real signal to reduce the quantizing noise to a minimum. This step magnitude information is applied to an integrator INT which will integrate, according to the bit at the comparator output, a positive (bit 1) or negative (bit 0) constant current for a time determined by the step magnitude. For instance, if the sampling period is divided into sixteen parts, to vary the step, an integration will be carried out for a time determined by the analysis circuit, corresponding to one of the sixteen parts or more. Therefore, it is seen that the step magnitude information is, in this case, represented by a pulse of variable length.

The decoder shown in FIG. 1b includes an integrator INT' receiving on the one hand, the signal coded in SΔ and the step magnitude information computed from this signal as previously carried out by circuit P' and supplies reconstructed analog signal SA as an output.

The operating principle of this invention will be described in the following with reference to FIG. 2. For this description, a telephone extension A, able to operate in two different ways, is used. In the first way, it is associated to a conventional telephone set and, in the second way, it is associated to a loud speaker and to a microphone. These two operating modes are selected through a switch CT placed either in position T (telephone) or in position MH (microphone, loud speaker).

In a telephone system of the digital type, microphone M is connected through amplifier A1 to a coder C and loud speaker HP is connected through an amplifier A2 to a decoder D. According to this invention, these coders and decoders are of the syllabic compression type and, therefore, are provided with a variable quantizing step. Therefore, they include means to compute the step to be used. An example of a circuit able to be used to compute the step in a delta coder will be described later with reference to FIG. 3.

A comparison circuit 3 compares the step lengths used in the coder and in the decoder, and supplies the result of the comparison on a line 4 which is connected to the decoder.

In the digital telephone system, it would be possible to establish a connection with an extension B of the same type, or with a conventional extension, but the anti-Larsen device of this invention more particularly applies when the microphone/loud speaker assembly is used since the Larsen effect is stronger in this case.

An extension B is shown in FIG. 2; the elements of this extension bear the same references as the ones of extension A, but prime symbols (') are added.

To establish a connection between A and B, microphone M of extension A is connected through a switching network not shown on the figure, to loud speaker HP' of extension B through channel 1 and microphone M' of extension B is connected to loud speaker HP of extension A through channel 2.

Assuming that the subscriber at extension A is talking and the subscriber at extension B is not, the level of the signal at the input of channel 1 exceeds the one of the input of channel 2; therefore, the step of coder C exceeds the step of coder C' and consequently exceeds the step of decoder D. In effect, decoder D decodes the signal issued from coder C' and consequently it has the same step as coder C'.

Therefore, an output signal will appear on line 4 and said signal will act on decoder D to prevent its step from increasing and consequently the analog signal reconstructed by this decoder will be limited in amplitude, which is the same as preventing the signals from returning through channel 2.

On the other hand, at extension B, the step of decoder D' exceeds the step of coder C' and consequently decoder D' will operate normally. Thus, the analog signal issued from A will be normally reconstructed in B.

The above description of the principle of the invention will be followed now by the description of a type of circuit able to be used for determining the step in a delta coder or decoder. It should be understood that other types of syllabic compression coders and decoders can be used as, for example, the one described in the IBM Technical Disclosure Bulletin, Volume 15, issue No. 7, of December 1972, pages 2054–2055.

The step determining circuit as shown in FIG. 3 includes a n-stage register 5 receiving signals SΔ issued from the comparator shown in FIG. 1. In a preferred embodiment, $n=4$. The four outputs of register 5 are applied to a binary comparator 6 which supplies an output if the four bits contained in the register are identical and equal either to 1 or to 0. The signal on output line 7 of comparator 6 is applied on the one hand, to reset input R of a counter 8 and to incrementing input I of a reversible binary counter 9. Both counters 8 and 9 are controlled by a signal of frequency F equal, for example, to 64 KHz which is the delta coding sampling frequency supplied by clock H. As long as there is a signal on the counter incrementing input, the contents of said counter increases on each sampling time. The contents of counter 9 is decreased when it receives a signal on input DI, which occurs when counter 8 has counted N sampling periods during which there was no signal applied to input R. In a preferred embodiment, $N=16$.

The outputs of binary counter 9 are applied to a decimal binary decoder 10 supplying the number of the step to be used as an output.

In a preferred embodiment of this invention, it appears that by using steps of two decibels each, it is possible to obtain appropriate coding for the voice signal.

An integration control device 11, which can be a counter/comparator assembly controlled by a signal Hk having a frequency which is a multiple of the sampling frequency, supplies, according to the step number information, a pulse of an appropriate duration which is a fraction of the sampling period as will be defined later. This pulse is applied to an integrator which integrates a positive or negative constant current in accordance with the value of the bit of the delta coding, during the up level of the pulse and will maintain the obtained value during the whole sampling period.

For example, the pulse duration can be computed for each step in the following way:

If steps of two decibels each are to be used, step 16 will have a value of 32 decibels, which corresponds to a decimal value $Y_{16}$ which can be computed from the following equation:

$$32 - 20 \log Y_{16}$$

which gives $Y_{16} = 40$ current units.

To obtain this value, the constant current is integrated during the whole sampling period $T = 1/F$.

The line of equation $$Y = \frac{40}{T} t$$

represents, therefore, the integration curve. From this line, it is possible to find the durations of the pulse controlling the integrator for each step, by searching for the decimal values Y for each step by resolving the following equation:

$$\text{Log } Y = \frac{1}{20} \times (2) \times \text{No. (step)}$$

Since Y is known for each step, the duration can be deduced from the following equation:

$$t = \frac{T}{40} \times Y$$

For example, for step N° 4 =

$$t = \frac{T}{40} \times 2.5$$

and for step N° 8 =

$$t = \frac{T}{40} \times 6.3$$

Thus, the control circuit will supply for each step number a pulse the up level of which has the appropriate duration obtained by the previous calculations.

The operation of the circuit shown in FIG. 3 is as follows. When the coding process begins, the step has a minimum value and during the first four sampling periods this step is used. If the four bits obtained during these four periods are equal, a signal appears at the output of binary comparator 6, said signal on the one hand, incrementing the contents of counter 9 so that the value of the step increases and, on the other hand, resetting counter 8.

During the following sampling periods, as long as the introduced bits are equal, the step will increase on each sampling period. On the other hand, if a bit of opposite value is introduced, counter 8 will start to count and the step will not vary any more. If the counter counts 16 clock periods without it being reset, a signal will appear at input DI of counter 9 and the contents of counter 9 will begin to decrease, which causes the step to decrease.

During each sampling period, a signal appears on one of outputs 1 to 16 of decoder 10, indicating the step number to be used, enabling circuit 11 to supply during each clock period, the corresponding pulse on output line S connected to the coder integrator. The complement of this pulse appears on line $\overline{S}$.

Now, with reference to FIG. 4, it will be shown how this step length information can be used according to this invention.

In FIG. 4, only one end of the connection is shown since channels 1 and 2 through which the connection between two extensions A and B is made, include the same elements as in FIG. 2. Only the comparing circuit of extension A is shown in more detail. The coders and decoders include a step determining circuit as shown in FIG. 3 and only the elements of this circuit required to understand the invention are shown in the coders and decoders.

The anti-Larsen device, according to a preferred embodiment of this invention, includes at each extension a latch FF of type D used to compare the pulse lengths representing the step values and an AND logic circuit 12 receiving on one of its inputs, the signal on line 7 and on its second input, the result of the comparison.

The type D latches are well known in the art and they include two inputs currently referenced C and D, a reset input R and two outputs Q and $\overline{Q}$. When two signals are applied to both inputs C and D, the signal from output Q has the level of the signal applied to input D when the level of the signal in C moves from 0 to 1.

The latch receives onto its input C, the reversed decoder step length pulse and onto its input D, the coder step length pulse. Since the coder and decoder in an extension are synchronized, the forward edges of this pulses coincide.

Another logic circuit including an AND circuit 13 and OR circuits 14 and 15 allow the carrying out of the comparison only when the coder and decoder steps exceeds a threshold value chosen, in a preferred embodiment, as equal to step No. 8 to avoid any ambiguity when the levels of the signals on both channels are low, in which case both channels operate normally.

A third logic circuit including an AND circuit 16 and an OR circuit 17 is provided at the output of latch FF. The operation of this circuit will be described later. Its function is to supply as an output the step duration pulse applied to the coder integrator to prevent the coder step duration from becoming lower than a limit value chosen, in a preferred embodiment, as equal to 4, value which corresponds to the voice and noise threshold to limit the channel gain in certain cases to be specified later.

The other elements: binary counter 9, decimal binary decoder 10, and integration command circuit 11, are the elements of the step determining circuit shown in FIG. 3. There has added to these elements, suffix 1 in the coder to indicate that said coder is on channel 1 and suffix 2 in the decoder to indicate that said decoder is on channel 2 for extension A shown in the figure.

Now, the operation of a preferred embodiment of the anti-Larsen device according to this invention will be described in the following. First of all, it will be recalled that the extension A coder step represents the level of the signal at the microphone output, therefore the level of the signal on channel 1, while the extension A decoder step is equal to the one of the coder of extension B connected to A, and therefore represents the level of the signal at the input of channel 2. To compare the levels of the signals at the input of each channel, it is, therefore, necessary to compare the coder and decoder steps at each extension.

First of all, in a first case, assume that the coder and decoder steps are both lower than the threshold value chosen as equal to 8. In these conditions, a signal is present on one of outputs 1 to 7 of decoders 10-1 and 10-2; therefore, both OR circuits 14 and 15 supply a signal to AND gate 13. Therefore, a signal is applied to the reset input of latch FF which is then set to 0. Output $\overline{Q}$ of the latch is, therefore, set to 1; thus, AND gate 12 transmits the signal of line 7 from circuit 6 (FIG. 3) to the stepping input of counter 9-2 and the decoder operates normally.

In this case, AND circuit 16 receiving on one of its inputs, signal 1 issued from output $\overline{Q}$ and the pulse of a duration corresponding to step 4 memorized in circuit 11-1, will deliver this pulse as an output. Therefore, OR circuit 17 will supply, as an output, either this pulse if the pulse on S-1 has a lower duration, or the pulse on S-1 if the step exceeds 4. In this way, the pulse at the output of OR circuit 17 will have always a value exceeding or equal to the one corresponding to step 4.

The step used for coding will exceed or be equal to step 4, which corresponds to the voice and noise threshold.

At extension B, the latch will be also reset and the decoder of extension B will operate normally. Since the decoders at each end of the connection operate normally, cut-offs at low levels are avoided.

Now, suppose that in a second case, at extension A, the coder step exceeds or is equal to 8 and that it exceeds the decoder step. For example, consider the case in which the coder step is 10 and the decoder step is 8.

The latch receiving the pulses shown in the figure will be set to 1 and the signal on output $\overline{Q}$ will be 0. Thus, the signal of line 7 (FIG. 3) will no longer be applied through AND gate 12 to the stepping input of counter 9-2. Consequently, the decoder step being not able to increase any more, will decrease. Channel 1 operates normally.

In this case, AND gate 16 is no longer conditioned and the signal at the output of OR circuit 17 is the same as the one on line S-1.

In a third case, assume that the coder step is lower than the decoder step. For example, say that the step is 8 for the coder and 10 for the decoder. The latch will be set to 0 (the signal on input D being low when the signal on input C moves from 0 to 1). The signal at output $\overline{Q}$ will be 1 and, consequently, the clock pulses will be applied through AND gate 12 to the counter of the decoder which operates normally.

In this condition, AND circuit 16 is conditioned and the pulse at the output of OR circuit 17 will be the pulse on line S-1 since, in the case taken as an example, the coder step is equal to 8, i.e. above 4.

On the other hand, if the coder step is lower than 4 and if the decoder step exceeds or is equal to 8, the pulse at the OR circuit 17 output will be the pulse of step 4 duration transmitted to OR circuit 17 by AND circuit 16.

Thus, in this third case, the step used in the coder cannot decrease below 4. Thus, the accidental noises able to occur at end A are prevented from causing an inversion of the operating mode.

Then, it is obvious that at extension B, the coder step exceeds the decoder step and the anti-Larsen device of this extension will prevent the decoder step from increasing. Then, the signal on channel 1 will be limited in amplitude.

If both communicating subscribers do not talk in the same time, any one of the channels operates normally if the steps exceed 8. If both subscribers talk in the same time, which is unusual, various cases are possible:

If the steps are lower than 8, both channels operate normally,

If the steps exceed 8 but remain close to this value, the anti-Larsen devices provided at each end of the connection act on the decoders and the signals on both channels are limited in amplitude, If the steps exceed 8 and are not equal, only one of the channels will operate normally.

While the invention has been particularly shown and described with reference to the preferred embodiment thereof, it will be understood by those skilled in the art that various changes in form and details may be made therein without departing from the spirit and scope of the invention.

What is claimed is:

1. In an acoustic feedback control device to be installed in the extensions of a digital telephone system in which the coders and decoders each include means to determine the respective voice level and means to provide and modify a compression code quantizing step according to said respective voice level, the improvement comprising, in each extension:
   a comparing means receiving the coder quantizing step and the decoder quantizing step, and
   an inhibit circuit connected to said comparing means and to said decoder for preventing the decoder quantizing step from increasing when the output signal of the comparing means indicates that the coder quantizing step exceeds the decoder quantizing step.

2. An acoustic feedback control device according to claim 1, wherein the extensions include a microphone connected to a coder and a loudspeaker connected to the decoder.

3. An acoustic feedback control device according to claim 1 wherein the coder is a delta coder of the syllabic compression type and in that the decoder is a delta decoder of the syllabic expansion type, each of said coder and decoder including a step determining circuit and an integrator controlled by the output of the step determining circuit.

4. A device according to claim 3 wherein each step determining circuit includes:
   a reversible counting means the contents of which increases on each sampling time of delta coding if $n$ bits in the preceding sampling period are equal,
   said reversible counting means being connected to supply on one of its outputs, during each sampling period, the step number to be used during said period.

5. A device according to claim 4 wherein a count of N register means connected to said counter to decrease the contents of the counter when said register means detects that during N consecutive sampling periods, N being a multiple of $n$, there was no series of $n$ equal bits.

6. A device according to claim 4 including a means to transform the step number information into a pulse the length of which is in relation with the step number and is a fraction of the sampling period.

7. A device according to claim 6 including comparison means responsive to the step length pulse which controls the integration of a positive or negative current according to the value of the delta coding bit, during the application of the pulse.

8. A device according to claim 7 wherein the comparison means includes a latch connected to compare the coder and decoder step length pulses.

9. A device according to claim 8 including a logic circuit connected to the output of said latch to prevent the decoder counter contents from increasing if the coder step exceeds the decoder step.

10. A device according to claim 8 including means to cause the latch to perform the comparison only when the steps exceed a threshold value.

11. A device according to claim 5 including a means to transform the step number information into a pulse the length of which is a function of the step number and is less than the length of the sampling period.

12. A device according to claim 11 including comparison means responsive to the step length pulse which controls the integration of a positive or negative current according to the value of the delta coding bit, during the application of the pulse.

13. A device according to claim 12 wherein the comparison means includes a latch connected to compare the coder and decoder step length pulses.

14. A device according to claim 13 including a logic circuit connected to the output of said latch to prevent the decoder counter contents from increasing if the coder quantizing step exceeds the decoder quantizing step.

15. A device according to claim 14 including means to cause the latch to perform the comparison only when the quantizing steps exceed a threshold value.

16. A device according to claim 15 wherein the extensions include a microphone connected to a coder and a loudspeaker connected to the decoder.

* * * * *